United States Patent
Heldt

(10) Patent No.: US 10,820,566 B2
(45) Date of Patent: Nov. 3, 2020

(54) ANIMAL CAGE ENVIRONMENTAL SYSTEMS AND METHODS

(71) Applicant: ANIMAL CARE SYSTEMS, INC., Centennial, CO (US)

(72) Inventor: David Russell Heldt, Littleton, CO (US)

(73) Assignee: ANIMAL CARE SYSTEMS, INC., Centennial, CO (US)

( * ) Notice: Subject to any disclaimer, the term of this patent is extended or adjusted under 35 U.S.C. 154(b) by 130 days.

(21) Appl. No.: 15/409,836

(22) Filed: Jan. 19, 2017

(65) Prior Publication Data
US 2017/0339910 A1    Nov. 30, 2017

Related U.S. Application Data

(60) Provisional application No. 62/342,645, filed on May 27, 2016.

(51) Int. Cl.
*A01K 1/00* (2006.01)
*A01K 29/00* (2006.01)
*A01K 1/03* (2006.01)

(52) U.S. Cl.
CPC ............ *A01K 1/0076* (2013.01); *A01K 1/031* (2013.01); *A01K 29/00* (2013.01)

(58) Field of Classification Search
CPC ...... A01K 1/0035; A01K 1/0076; A01K 1/03; A01K 1/031; A01K 29/00
USPC .................................. 119/417–421, 455–458
See application file for complete search history.

(56) References Cited

U.S. PATENT DOCUMENTS

| | | | | |
|---|---|---|---|---|
| 1,042,635 A | * | 10/1912 | Adair | A01K 41/026 237/4 |
| 1,876,325 A | * | 9/1932 | Crawford | A01K 31/18 119/303 |
| 2,002,380 A | * | 5/1935 | Wernicke | A01G 9/24 47/69 |
| 2,692,578 A | * | 10/1954 | Manning | A01K 31/16 119/335 |
| RE26,406 E | * | 6/1968 | Bolesky | H01H 37/54 337/343 |
| 3,451,028 A | * | 6/1969 | Schmitt | H01H 37/5427 337/343 |
| 3,779,210 A | * | 12/1973 | Blair | A01K 1/0227 119/457 |
| 3,877,420 A | * | 4/1975 | Eagleson, Jr. | A01K 1/031 119/419 |
| 3,924,571 A | * | 12/1975 | Holman | A01K 1/031 119/419 |
| 4,332,214 A | * | 6/1982 | Cunningham | A01K 1/0353 119/28.5 |
| 4,448,150 A | * | 5/1984 | Catsimpoolas | A01K 29/005 119/455 |
| 4,699,088 A | * | 10/1987 | Murray | A01K 1/0356 119/419 |

(Continued)

*Primary Examiner* — Ebony E Evans
(74) *Attorney, Agent, or Firm* — Lando & Anastasi, LLP

(57) ABSTRACT

An animal cage heating system includes a support structure for support animal cages and a plurality of thermal elements. Each thermal element is configured to provide localized temperature adjustment to one of the animal cages, and each thermal element adjusts the temperature of an animal cage independent of temperature adjustment provided to other animal cages.

24 Claims, 9 Drawing Sheets

(56) References Cited

U.S. PATENT DOCUMENTS

| | | | | |
|---|---|---|---|---|
| 4,721,060 A * | 1/1988 | Cannon | A01K 1/031 | 119/420 |
| 4,839,498 A * | 6/1989 | Chak | A01K 63/003 | 119/269 |
| 4,860,741 A * | 8/1989 | Bernstein | A61D 7/04 | 128/204.18 |
| 5,000,120 A * | 3/1991 | Coiro, Sr. | A01K 1/031 | 119/419 |
| 5,042,429 A * | 8/1991 | Deitrich | A01K 1/031 | 119/419 |
| 5,092,269 A * | 3/1992 | Phillips | A01K 1/03 | 119/452 |
| 5,311,836 A * | 5/1994 | Sheaffer | A01K 1/031 | 119/419 |
| D347,913 S * | 6/1994 | Wellington | D30/108 | |
| 5,337,696 A * | 8/1994 | Edstrom | A01K 1/03 | 119/456 |
| 5,513,596 A * | 5/1996 | Coiro, Sr. | A01K 1/031 | 119/457 |
| 6,158,387 A * | 12/2000 | Gabriel | A01K 1/031 | 119/419 |
| 6,308,660 B1 * | 10/2001 | Coiro, Sr. | A01K 1/031 | 119/419 |
| 6,553,939 B1 * | 4/2003 | Austin | A01K 1/031 | 119/455 |
| 6,584,936 B2 | 7/2003 | Rivard | | |
| 7,252,050 B2 * | 8/2007 | Cole | A61M 16/10 | 119/416 |
| 7,594,481 B2 * | 9/2009 | Carter | A01K 1/031 | 119/418 |
| 7,739,984 B2 * | 6/2010 | Conger | A01K 1/0356 | 119/417 |
| 9,655,350 B2 * | 5/2017 | Lari | A01K 63/003 | |
| 10,165,762 B2 * | 1/2019 | Hughes | A01K 63/065 | |
| 2003/0150395 A1 * | 8/2003 | Mauderli | A61B 5/4824 | 119/417 |

* cited by examiner

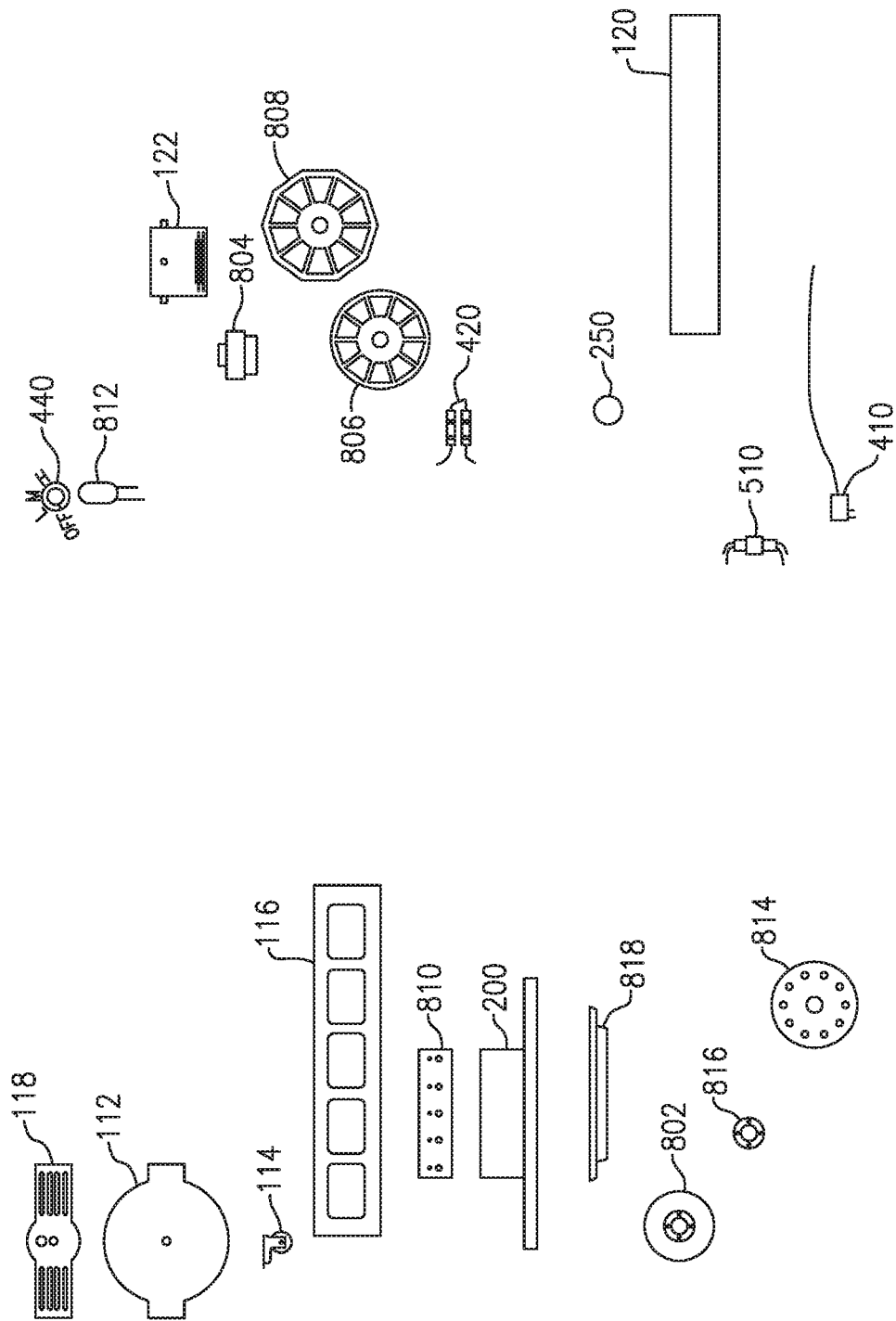

ANIMAL CAGE ENVIRONMENTAL SYSTEMS AND METHODS

CROSS-REFERENCE TO RELATED APPLICATIONS

This application claims priority under 35 U.S.C. § 119(e) to U.S. Provisional Patent Application Ser. No. 62/342,645, titled "ANIMAL CAGE HEATING APPARATUS, SYSTEM, AND METHOD," filed on May 27, 2016 which is incorporated by reference herein in its entirety.

BACKGROUND

The present disclosure relates generally to the field of animal caging systems, and more specifically to an animal caging system that supports animal recovery periods through regulated temperature.

Caging systems have been used in laboratories and research facilities to hold laboratory animals, such as rats and mice. Such facilities often house large numbers of laboratory animals in a relatively limited amount of space. Environmental considerations are conventionally handled by providing a single environmental control that provides the same environmental characteristics, such as temperature, to all the animals in a facility or within a caging system made up of a rack or enclosure of multiple animal cages.

When animals are taken from the caging system for veterinary treatment, surgery, or other handling, they may need time to recover after the procedure. Recovery may create unique needs for adequate temperature, ventilation, gases, water, medication, and food to each animal. Conventional laboratory caging systems, even those intended for recovery, use common temperature regulation affecting multiple or all animal cages in the system. A conventional method is to provide circulating air of a regulated temperature, causing all areas of the caging system to be substantially the same temperature.

Some animals may have different environmental needs from other animals, and may have different needs at different points in time. Therefore a need exists to provide environmental variation, such as temperature, heating or cooling, ventilation and gas flow, among different animal cages, and to provide a variation in temperature within an individual cage, allowing an animal to move to warmer or cooler regions as needed.

SUMMARY OF THE INVENTION

Aspects and examples are directed to an animal caging systems and methods that provides heating or cooling to individual animal cages and selectively provides gases to individual animal cages.

According to one aspect, an animal caging system is provided and includes a support structure, configured to support a plurality of animal cages, and a plurality of thermal elements, each of the plurality of thermal elements configured to provide localized temperature adjustment to a selected one of the plurality of animal cages independent of temperature adjustments provided to others of the plurality of animal cages.

In some embodiments each of the plurality of thermal elements is configured to receive a fluid or electricity. In some embodiments each of the plurality of thermal elements is configured to adjust temperature in only a portion of the selected animal cage. Some embodiments include a controller configured to control a temperature of the selected animal cage.

Some embodiments include a coupling tunnel to provide access by an animal between at least two of the plurality of animal cages. In some embodiments the support structure is configured to allow at least one of the plurality of animal cages to be removable from the support structure. In some embodiments the support structure is a rotatable platter.

Some embodiments include a gas supply line coupled to the animal caging system and configured to couple a gas source to provide gas to one or more of the plurality of animal cages independent of gas provided to others of the plurality of animal cages.

According to another aspect, an animal caging system is provided and includes one or more animal cages; one or more platters configured to support the one or more animal cages; and at least one thermal element configured to provide heat to at least one of the one or more animal cages independent of heat provided to other animal cages.

In some embodiments, one or more of the animal cages includes a gas inlet configured to accept a gas supply.

In some embodiments, the thermal element may be an electrical component, the electrical component being capable of converting electrical energy to thermal energy. The thermal element may be a fluid conduit including a heat transfer surface.

Some embodiments include a controller configured to control the thermal element. The controller may be configured to variably control the temperature of the thermal element.

According to some embodiments, the thermal element is disposed so that it provides heat to only a portion of the at least one of the one or more animal cages.

Some embodiments include a rack frame configured to support the one or more platters and including at least one outlet to selectively provide a gas to at least one of the one or more animal cages.

According to another aspect, a method of providing heating or cooling to an animal cage is provided and includes supporting a plurality of animal cages by a support structure and providing thermal variation to each of the plurality of animal cages independent of other animal cages supported by the support structure.

In some embodiments, providing thermal variation includes providing electricity or fluid. In some embodiments, providing thermal variation to each of the plurality of animal cages may include providing thermal variation to only a portion of each of the plurality of animal cages.

Some embodiments include controlling a quantity of thermal energy provided to or from each of the plurality of animal cages to regulate a temperature of each of the plurality of animal cages.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 9 is a schematic view of individual components of the system shown in FIG. 7.

DETAILED DESCRIPTION

Figure 1:
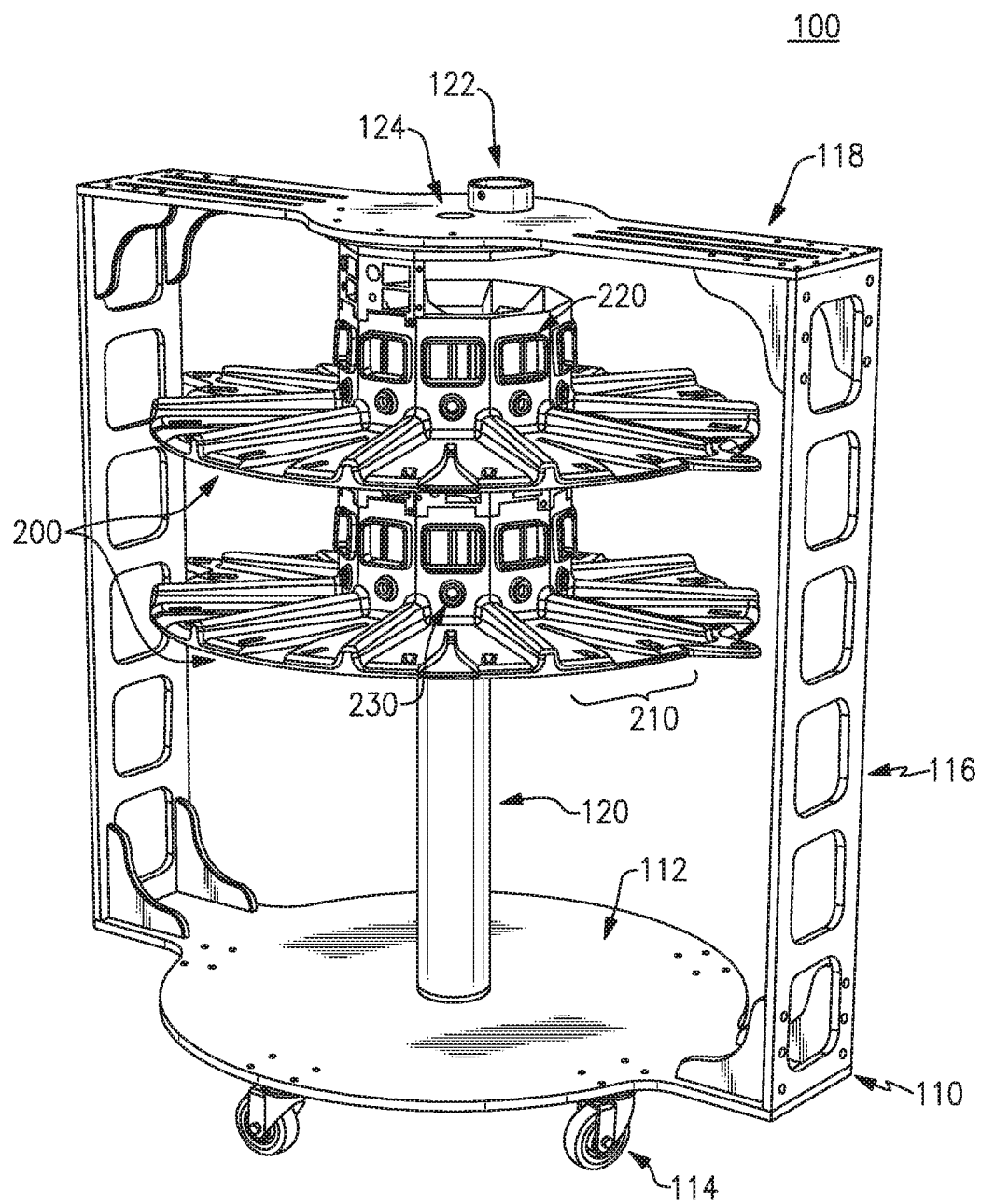
FIG. 1 is a perspective view of a caging system in accord with aspects of the disclosure.

Aspects of the present disclosure are directed to novel animal caging systems capable of providing variation in environmental temperature, ventilation, and gases, for animals, such as research animals, animals recovering from veterinary procedures, animals undergoing treatment, surgery, or other handling, and the like. These animal caging systems provide flexibility in managing the individual environment of multiple animals, such as thermal characteristics, administration of gases, and ventilation environment so that an operator may adjust the environment based on individual needs of each animal. The animal caging systems allow flexibility with group or individual temperature control, provide for temperature variation within an individual cage (to allow the animal to regulate its own body temperature by moving to different areas), and to provide gas flow for air circulation and/or the administration of drugs, anesthetics, oxygen enrichment, etc. These animal caging systems may also provide other benefits such as integrated water supply systems.

The animal caging systems disclosed herein may include, in some examples, a rack providing multiple platters, each platter segmented to provide support for multiple animal cages, and each segment configured to provide temperature regulation, water supply, and/or air circulation and gas flow to the individual animal cage.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Laboratory mice are routinely held at temperatures well below their "thermoneutral zone," the temperature range in which their metabolism functions most efficiently, without the need to expend excess energy to heat their bodies. The mouse thermoneutral zone (TNZ) is from around 30-32° C. But for human worker comfort, mice are held at ambient room temperatures between 20-26° C. in a typical vivarium, well below their natural TNZ. Accordingly, the mice are routinely trying to generate enough heat to stay warm, which causes their heart rate and metabolism to change, and they eat more food to make up the energy.

There is now an extensive and growing body of literature that suggests that the fundamental physiological shift that occurs in these chilly mice are skewing research results, affecting studies in physiology (e.g., stress hormone levels, food intake, adaptive thermogenesis, brown fat physiology), metabolism (e.g., sleep, obesity, insulin production/diabetes, cardiovascular, organ size, tail length, basal metabolism), immunity/inflammation (e.g., fever, cytokines, atherosclerosis, vascular inflammation, and others), and cancer (e.g., chemotherapy, immunosuppression, growth and metastasis, anti-tumor immunity). There is also suggestion that several other conditions or phenomena that are modeled in mice are also likely to be influenced by housing temperature (e.g., ageing, exercise, microbiome studies to name a few). Evidence is mounting that rodents housed below their TNZ are cold-stressed, hypermetabolic, hypertensive, sleep-deprived, obesity-resistant, aging-resistant, and tumor-prone compared with mice housed at thermoneutrality. The same genotype of mouse has a very different phenotype and response to physiological or pharmacological intervention depending on their environment relative to thermoneutrality.

For example, a recent study found that tumors in colder mice grew faster and more aggressively than those in mice housed at warmer temperatures, which held true for a variety of cancer types—breast, skin, colon, and pancreatic. Colder mice have twice the heart rate of animals housed in warmer conditions, gain weight faster, become more obese at earlier ages, have higher levels of lipids in their blood, and exhibit a higher respiration rate. Even control groups are routinely housed in too cold an environment, so the "healthy" mouse used as a standard for comparison isn't being appropriately modeled under current conditions.

Solving the problem isn't as simple as increasing the thermostat in mouse facilities. For one, keeping mouse rooms at around 30° C. would make the environment intolerable for research and technical staff, who typically wear layers of protective garments, including full body suits, masks, and goggles, to prevent cross-contamination. The thermal preferences of mice also change throughout the day and throughout their life spans, along with behavioral and experimental variations (e.g., age, gender, activity). Therefore, it is imperative that temperature levels be adjustable to one or more cages independent of the thermal environment provided to other cages, and that heating or cooling be provided to only a portion of a selected animal cage so the animal can choose his/her proximity to the, e.g., heat source, and self-regulate their body temperature based on individual need or preference. Having a set temperature affecting an entire cage (whether at ambient room temperature or otherwise) would be inappropriate for some behaviors some of the time. Denying an animal's control over, or escape from, a non-preferred cage temperature is distressing to the animal.

Strategies recommended thus far to provide mice with temperatures that approach their preferred climate include providing nesting material and increasing the number of mice allowed to inhabit a single cage. However, provision of nests and huddling in groups, while increasing cage temperature, does not bring the animals into the TNZ range for mice. When the number of mice in any given cage is altered, either permanently or temporarily (for example, one mouse is removed for an experiment and may or may not be returned to the cage), temperature in the cage and nest will be altered, inducing yet further variables.

Research mice require thermal support in disease model testing and under other experimental conditions. Mice undergo a variety of procedures or inherent phenotypes that require additional heat support; for example, post-anesthetic recovery, post-water procedures, delicate transgenic phenotypes, young weanlings, supportive care for debilitated disease models, etc. Currently, heat support for these animals is generally provided by an electric heat pad. Problems with using heat pads include, as above, providing the cage with one set temperature, overheating, underheating, burns, and hot and cold spots in the heat pad. These heat pads can only be used on a short-term basis and only under supervision in animal facilities due to their potential as a fire hazard. Environmental systems in accord with aspects and embodiments disclosed herein allow mice to be housed for indefinite periods, including overnight and on weekends, when personnel presence in the facility is reduced, absent, or intermittent. Conventionally, cages are removed from a racking system when placed on a heat pad, requiring additional procedural or housing space, as well as impacting ventilation and decreasing the quality of air in the cage. With aspects and embodiments disclosed herein, thermal elements are configured into the rack platter itself, and animals can remain in their home cages docked on the rack and thereby maintain adequate ventilation and other environmental aspects provided by the rack system.

In addition to heat support, the reverse can be said for using cooled fluid to study cold stress in mice, especially with studies like immune suppression. Conventionally these types of studies are conducted in walk-in coolers outside a vivarium, for example, which is less than ideal as a vessel or environmental condition.

While one temperature for all housing combinations would be convenient, it is not conducive to mouse well-being. Caging systems such as disclosed herein can encompass all the factors of heat or cold adjustment to individual cages, allowing animals to thermoregulate on their own based on individual need by moving toward or away from a heat or cold source, without relying on cage factors like mice number and/or nesting material, and without infringing on worker or staff comfort. Thus caging systems such as disclosed herein may equip facilities and researchers with a system for more reliable, translatable, and consistent experimental results. Fewer variations and more reliable results contributes to a reduction of animal testing overall, and a less stressful environment for the animals is a refinement for mouse well-being. This reduction and refinement support two of the three R's of the guiding principles of the humane use of animals in scientific research.

FIG. 1 illustrates one example of an animal caging system 100 that includes a rack frame 110 and multiple platters 200. The rack frame 110 includes a bottom plate 112, wheel casters 114, side frame uprights 116, and top plate 118. The bottom plate supports a center support column 120 that supports the platters 200, which are stackable, and rotatable by bearings (not shown). In a central region of each platter 200 are conduits that allow for the provision of water, airflow, and electrical connections to the platters 200. A center section of the column 120 may also form a plenum to allow the provision of fluid gases, as discussed in more detail below. Also shown in FIG. 1 is a top plate exhaust port 122 for air and gas flow, and an access opening 124 to allow for wires to provide electricity.

Each of the platters 200 has multiple segments 210, and each of the segments 210 provides the support structure for an individual animal cage, each of which may be a removable cage. Each segment 210 may also provide a display 220 to show voltage and temperature settings for each cage, and further may supply a water connection 230 and airflow connection (not shown) to each cage. More detail about the structure of platters 200 and integral water supply provided via water connections 230 may be had with reference to U.S. Pat. No. 7,594,481 which is hereby made part of this disclosure and is incorporated by reference in its entirety.

The platters 200 of FIG. 1 are shown to allow for removable cages, but other examples may have permanently attached cages or may have a mix of removable and permanently attached cages. Individual displays 220 are shown in FIG. 1, while in other examples the displays may be arranged differently, for example there may be one or more consolidated displays that provide information about multiple cages at once, or may be cycled through displaying information about individual cages, or may selectively display information about any one or group of cages. Other examples may have different arrangements of displays or may have no displays at all. Similarly, while water connections and airflow connections have been discussed, in examples there may be fewer air and water connections or there may be no air or water connections.

Figure 2:
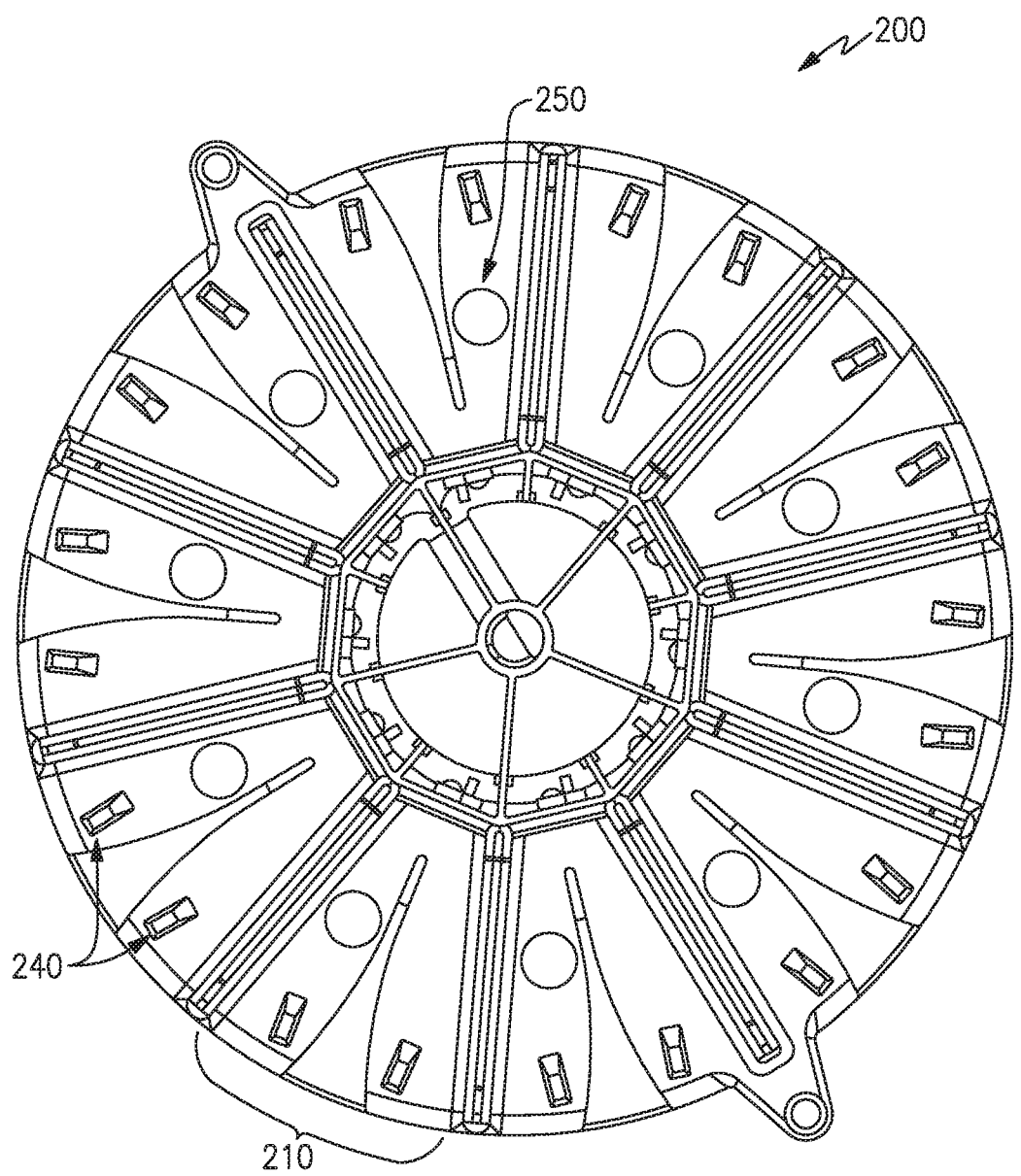
FIG. 2 is a top view of a platter configured to hold multiple animal cages.

The animal caging system 100 of FIG. 1 is configured to provide individual heating or cooling to animal cages via one or more of the platters 200. FIG. 2 illustrates a platter 200 from a top view and shows the individual segments 210 configured to accommodate a removable animal cage (not shown). The platter 200 includes pairs of notches 240 included on each segment 210 that provide for retention of an animal cage. Also shown are thermal discs 250 included on each segment 210 that may be a source of heating, cooling, or both, to regulate temperature inside an individual animal cage. An individual animal cage will rest on top of a segment 210 and engage with the notches 240 to prevent sliding off the platter, and thereby a portion of the animal cage will be resting over top of the thermal disc 250.

The thermal discs 250 conduct heat into or away from the individual animal cages. For example, the thermal discs 250 may include a heating element. The heating element may be incorporated into the disc or may be positioned just below the disc, and may be integral to the platter or the disc. An example heating element is an electrical resistor element that converts electrical energy to thermal energy. The heating element also may be a resistor, a light bulb, an infra-red source, a MEMS heat pump, or a conduit for heated fluid. While the heating element is discussed in association with a thermal disc 250, in some examples the heating element could be integral to the platter without a disc 250. In addition, the heating element and/or disc 250 may take any shape, circular or otherwise, and may be flush with the platter, may create a raised portion on the platter, or may be recessed. The heating element and/or disc 250 may take any form sufficient to transfer heat into or away from an animal cage when the animal cage is resting on a segment 210 of the platter 200. It is to be understood that the thermal disc 250 may alternatively be a cooling element, or may be capable of providing either heating or cooling. For example, a MEMS heat pump may be operated in differing modes to either remove heat or supply heat. An alternate example includes a fluid conduit that may selectively convey heated or cooled fluid and thereby provide or remove heat as desired.

Figure 3:
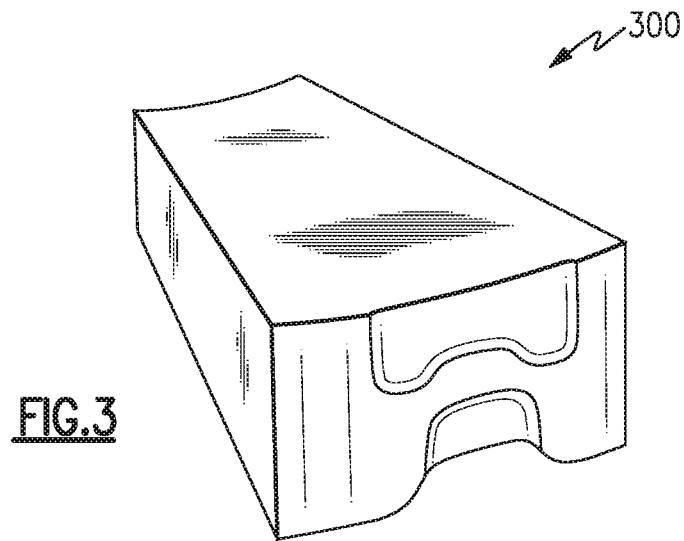
FIG. 3 is a perspective view of an animal cage that can rest on a portion of the platter of FIG. 2.

FIG. 3 shows a simplified view of an individual animal cage 300. As shown in FIG. 3, the animal cage 300 is shaped to fit on a segment 210 of the platter 200. In this example, the animal cage 300 is wedge shaped to be accommodated by the segment 210 of the platter 200. In other examples, the platter 200, the segment 210, and the animal cage 300 may take other forms or shapes. With reference to FIGS. 2 and 3, in certain embodiments, the thermal disc 250 warms up and provides thermal energy to the animal cage 300 in the vicinity of the thermal disc 250. In this manner, the temperature in the individual animal cage 300 may be controlled independent of the other animal cages. Additionally, the temperature in the animal cage 300 will generally be higher in the immediate vicinity of the thermal disc 250 (when used for heat) and will be lower in other regions within the animal cage 300, thus allowing the animal to move to warmer or cooler regions of the cage at will.

Figure 4:
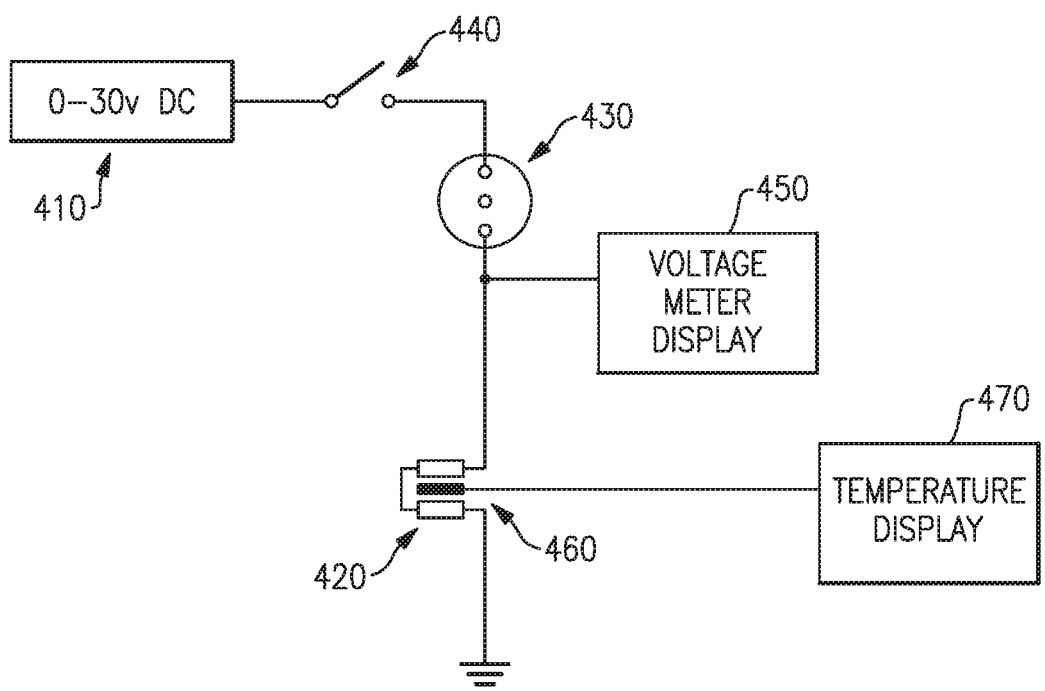
FIG. 4 is a schematic diagram of a heating system for use with the caging system of FIG. 1.

An example using an electrical source and a resistive element to provide heat and temperature regulation to individual animal cages 300 will be described with reference to FIG. 4. FIG. 4 shows a schematic diagram of an electrical circuit to provide heat to an animal cage 300 via thermal disc 250. The circuit of FIG. 4 is shown in simplified form for clarity and does not show all elements of any particular example. A power supply 410 (which may supply multiple segments and animal cages) provides DC electricity to a heating element 420 through a potentiometer 430. As discussed above, the heating element 420 may be incorporated into the thermal disc 250 or may be provided below the thermal disc 250 or may be integral to the platter 200. In the example of FIG. 4, the heating element 420 is shown as two resistors. An example value of the resistors is 43 Ohms each which may provide sufficient conversion into thermal energy when powered at 15 volts, but it is understood that other values may be used according to operational parameters or variations in application. The potentiometer 430 provides a user with the ability to adjust the voltage and current provided to the heating element 420 and thereby control the amount of thermal energy produced, thereby adjusting the temperature in the animal cage 300. In one example, the potentiometer 430 may adjust between 0 and 100 Ohms, but other values may be used.

In one example, the power supply 410 may be housed on the rack frame 110 and a slip-ring (not shown) may be provided at the access opening 124 (see FIG. 1) to allow wires (to carry the DC voltage) to be inserted down through the central region of the platters. The slip-ring may allow rotation of the platters 200 without twisting or fouling the wires. While the power supply 410 is shown and described as a DC supply providing up to 30 volts, it may be any power supply suitable to provide the amount of electrical energy necessary, and in particular it may be an AC power supply and may provide significantly higher voltages to accommodate changing operational parameters or applications. In some examples a single power supply 410 provides power to multiple heating elements 420 via multiple potentiometers 430, one for each segment 210 to heat each individual animal cage 300. In other examples, each heating element 420 may have their own power supply.

The example of FIG. 4 shows additional elements that may be included. A power switch 440 may be incorporated into each segment 210 to allow switching of power to the heating element 420 of individual animal cages 300. A voltage meter display may also be incorporated into each segment 210 to detect and display the voltage supplied to the heating element 420, for use by the operator in determining a proper setting of the potentiometer 430 or for assessing proper operation of the unit. A temperature sensor 460 may detect the temperature being generated by the heating element 420 and display a temperature scale or reading to the operator. In some examples, the temperature sensor may be coupled to a feedback circuit that regulates the voltage provided to the heating element 420 to maintain a particular temperature set by the operator. Inputs to each of the displays 450, 470 and to the heating element 420 may be provided with trim potentiometers for calibration. Each of the displays 450, 470 may be part of a display 220 (see FIG. 1) provided at each segment 210. In certain examples, the displays 450, 470 may be provided elsewhere.

Figure 5A:
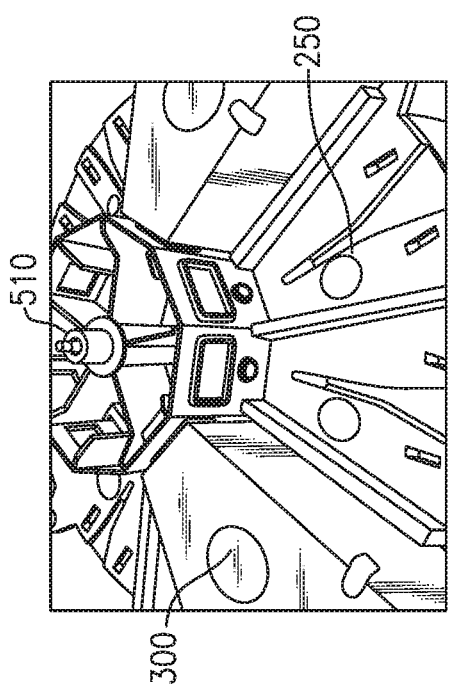
FIGS. 5A-5E are pictorial views showing details of an exemplary platter with electrical connections and components.
Figure 5C:
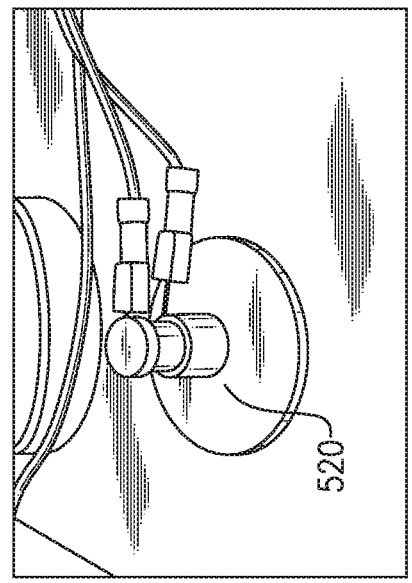
Figure 5B:
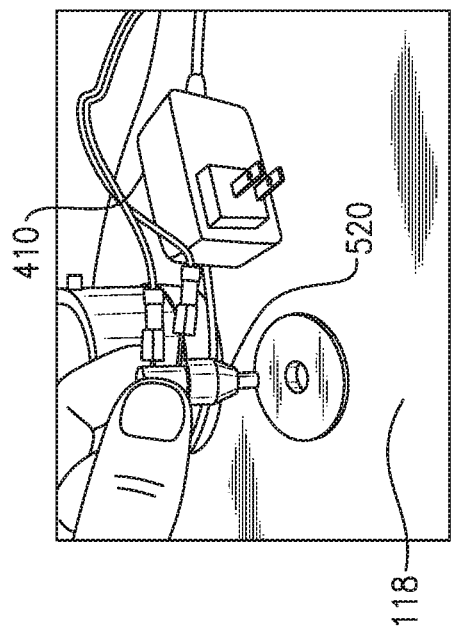

Additional detail of the installation and electrical connectivity of at least one example may be seen in FIGS. 5A-5E. FIG. 5A shows a top platter 200 with two animal cages 300 disposed thereon, and a slip-ring 510 electrical connector, or pass-through, to provide electrical wires into the central region of the platter 200 so that the platter may rotate without twisting the wires. FIG. 5B shows a power supply 410 with an electrical connector 520 that mates to the slip-ring, just underneath the top plate 118. FIG. 5C is a closer view of the connector 520 plugged into the slip ring.

Figure 5E:
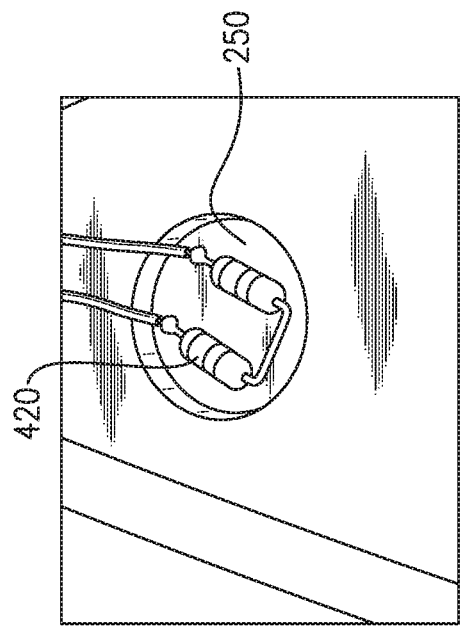
Figure 5D:
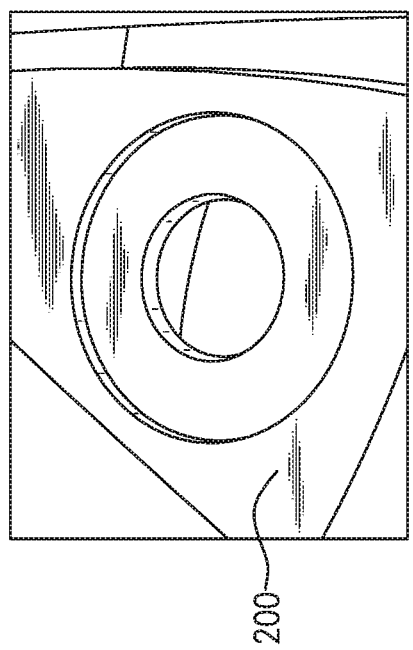

Shown in FIG. 5D is a detail view of an example of the platter 200, shown from the top, with a recess and opening for a heater element and thermal disc (not installed). FIG. 5E shows the platter 200, from the bottom side, with a heating element 420 in place underneath a thermal disc 250.

Figure 6:
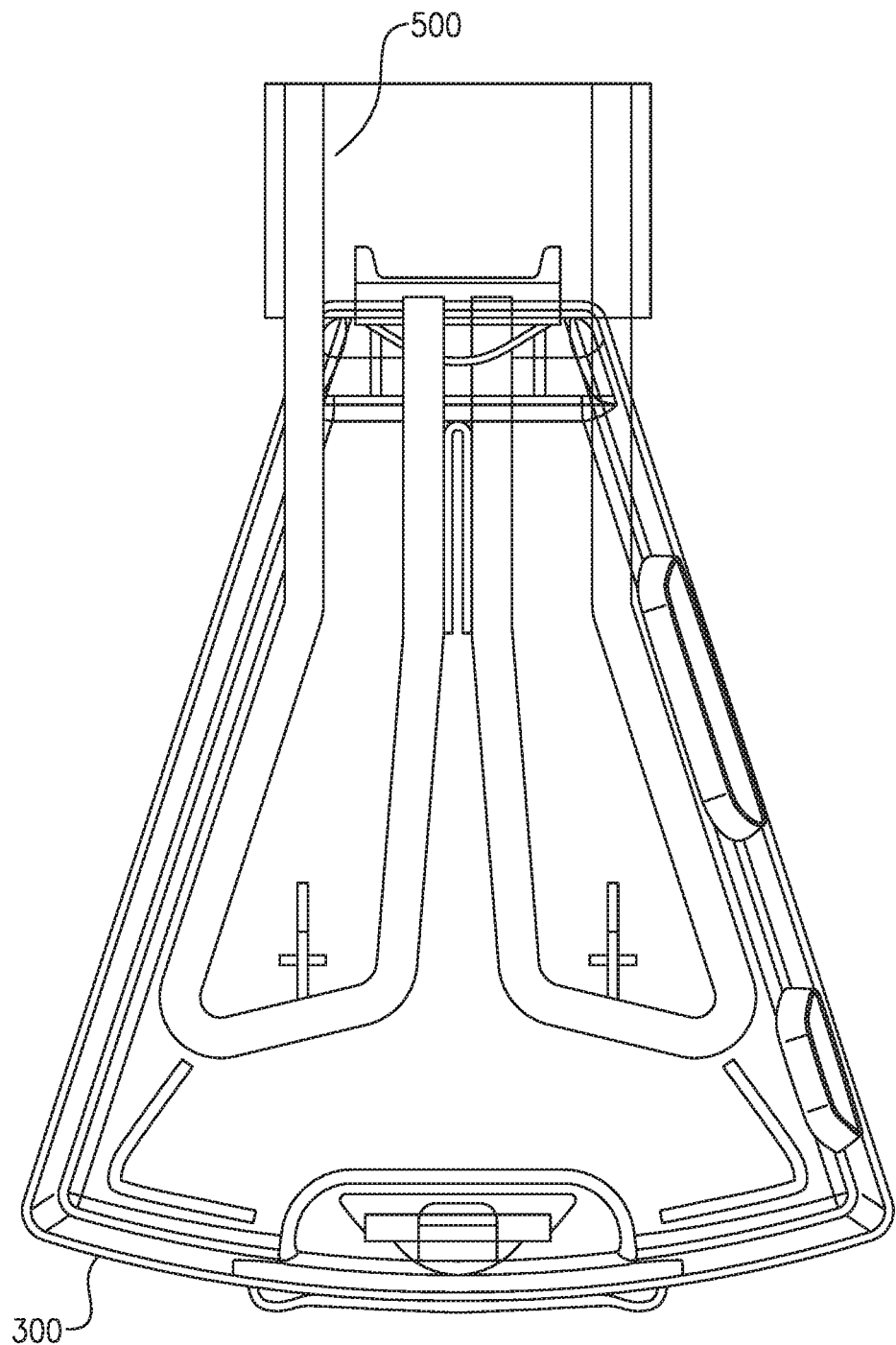
FIG. 6 is a top or bottom view of an animal cage showing a fluid circulator for heating.

As discussed above, in some examples heat may be provided to or removed from the animal cage 300 by a fluid flow. One example is partially illustrated in FIG. 6, which may be considered a top or bottom view of an animal cage 300 (shown transparent) with a fluid conduit 500 as the thermal element. In this example, the fluid conduit 500 is located below the animal cage 300. Heated or cooled fluid, such as water, for example, may be provided to flow through the conduit 500 and the exterior surface of the conduit acts as a heat exchanger with the surrounding material, which in turn conducts thermal energy into or out of the animal cage 300. The surrounding material could be air, as in the case of a gap between the fluid conduit 500 and the animal cage 300 or the fluid conduit 500 and the animal cage 300 could be formed so they are in contact with each other. Alternately, the conduit 500 could be integrally formed to the animal cage 300. In some examples, the conduit 500 includes two or more independent conduits, such as a left and right conduit, and may allow different fluid temperatures or flow rates in each. In such examples, an operator may have additional flexibility to control variations in temperature throughout the animal cage 300.

Regardless of the form of the thermal elements, for heating or cooling, in some examples, the thermal elements may be incorporated into individual animal cages 300 rather than being associated with the segments 210 of the platter 200. For example, connections or conduits may be provided by the platter 200 to provide electricity or fluid to components of the animal cage 300, and the animal cage 300 may include a corresponding connection to engage the platter 200 to receive the electricity or fluid, and the animal cage 300 may include an element (electrical, convective, conductive, etc.) to receive, convert, and/or distribute the electricity or fluid provided as thermal energy to or from the interior of the animal cage 300.

For example, one or more electrical heating elements may be disposed on or inside an animal cage 300 at one or more positions. Such heating elements may be of any of the forms discussed, or others, and may or may not be associated with a thermal disc 250. Such heating elements may be positioned in various locations, such as a bottom, the sides, or a top of the animal cage 300, and wired to a connector on the exterior of the animal cage that engages with an electrical connector on a platter 200 to provide electrical energy in a manner similar to that discussed above.

As an alternate example, one or more fluid conduits may be disposed on or inside an animal cage 300 at one or more positions. Such fluid conduits may be positioned in various locations, such as a bottom, the sides, or a top of the animal cage 300, and in fluid communication with a conduit connection on the exterior of the animal cage that engages with a conduit connection on a platter 200 to provide heated or cooled fluid in a manner similar to that discussed above.

Regardless of the form, placement, or position of the thermal element, in some examples there may be additional thermal elements per segment 210 or per animal cage 300, allowing greater flexibility in heat distribution throughout the animal cage 300. In examples, the individual thermal elements may be grouped for common control of multiple thermal elements or for common control of multiple segments 210 or animal cages 300.

Figure 7:
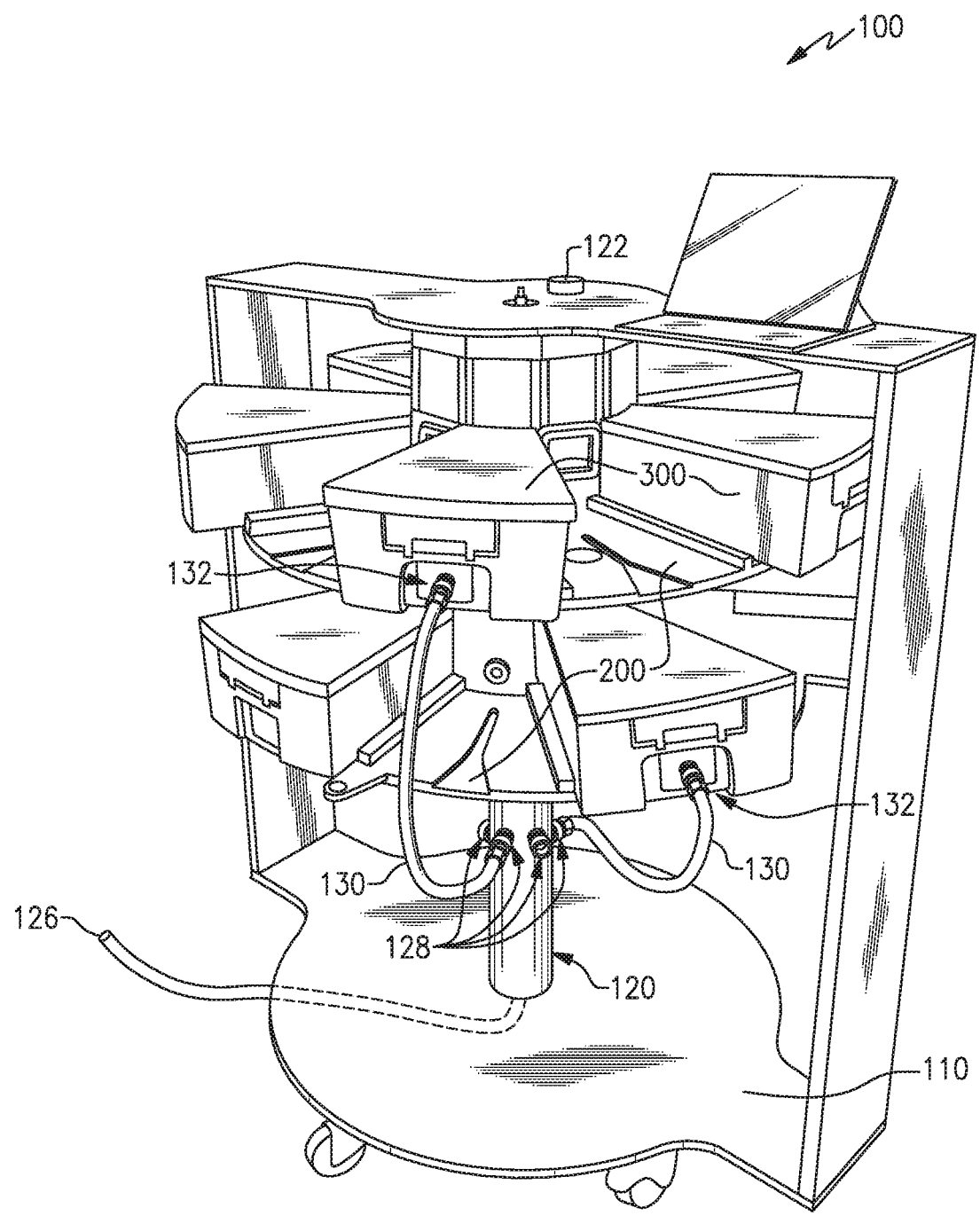
FIG. 7 is a pictorial view of an example of a caging system.

FIG. 7 illustrates an example of an assembled animal caging system 100 having further components for the provision of gases to individual animal cages 300. High level components shown include the rack frame 110, two platters 200, and a number of animal cages 300. The example animal caging system 100 of FIG. 7 has gas flow components including a gas supply line 126 which is a tubing or piping system that provides gases to one or more outlets 128 to which a supply hose 130 may be coupled to further provide the gases to an animal cage 300 at a gas inlet 132

Examples of gases to be supplied may include anesthetic gases, medicinal gases, oxygen, experimental respiratory gases, and the like, or various combinations of these depending upon the application. An operator may couple the gas supply line 126 to a gas source to supply the gases. The gas supply line 126 may be directly coupled to the outlets 128 or may provide gas into a plenum inside the support column 120 to which the outlets 128 are coupled. The outlets 128 may include disconnect features that disable flow through the outlets 128 when a supply hose 130 is not connected and enable flow through the outlets 128 when a supply hose 130 is connected. The gas inlets 132 may also include disconnect features. Controls that allow an operator to adjust a rate of flow of gases into an individual animal cage 300 may further be provided, e.g., at an outlet 128, a supply hose 130, a gas inlet 132, or elsewhere. Each animal cage 300 may also have air inlets, such as ventilation slots, that allow ambient air to flow into the animal cage 300.

The exhaust port 122 provides a gaseous flow passage out of the animal cages 300 via a central region of the platters 200. An operator may couple a negative pressure source to the exhaust port 122 and thereby cause air to flow into each of the animal cages 300 and may also cause or assist in causing gas flow provided to the inlets 132. In this manner a particular flow of air and, optionally, gases, may be provided to individual animal cages 300. Additionally, air filters may be provided at the air inlets and gas filters may be provided at the gas inlets 132.

In certain embodiments, air inlets and gas inlets 132 may be formed as a single inlet to each animal cage 300. In some embodiments such an inlet may selectively allow only one of a provided gas (or mixture) or ambient air at a given time. In certain embodiments, a mixer may be provided to mix a gas source with air or other gases. FIG. 7 illustrates a particular embodiment for the provision of gases to individual animal cages 300, but other structural arrangements may be equally operative and in keeping with embodiments disclosed herein. For example, a gas inlet on each cage may engage with or couple to a supply outlet on a segment of the platter. Individual valves for each animal cage may allow control of gas flow to individual cages. A gas supply line and gas routing may take other forms. Other embodiments may include different structural arrangements.

In some embodiments, two or more animal cages 300 may be coupled together to allow an animal to move freely between them. For example, ports may be provided on the front of the animal cages 300 and a connecting tunnel may be selectively installed by an operator to couple two cages together. In certain embodiments, the animal cage 300 may be provided with multiple ports so that multiple animal cages may be daisy-chained together. The ports may include a mechanical door that seal the port when the connecting tunnel is not coupled thereto, thereby preventing the animal from accessing the port (e.g., escaping the cage) when it is not coupled to an adjacent cage. When a connecting tunnel is installed, to couple two or more cages together, an animal in any one of the coupled cages may freely access the tunnel to transit to another coupled cage. This may allow a broader range of temperatures to be provided to an animal as one cage may be heated or cooled to a particular average temperature and another may be heated or cooled to a different average temperature, or may not be heated or cooled, and the animal may move between warmer and cooler locations across multiple cages as well as within a single cage. Coupling of cages by tunnels may also provide controlled socialization or other research benefits.

Figure 8:
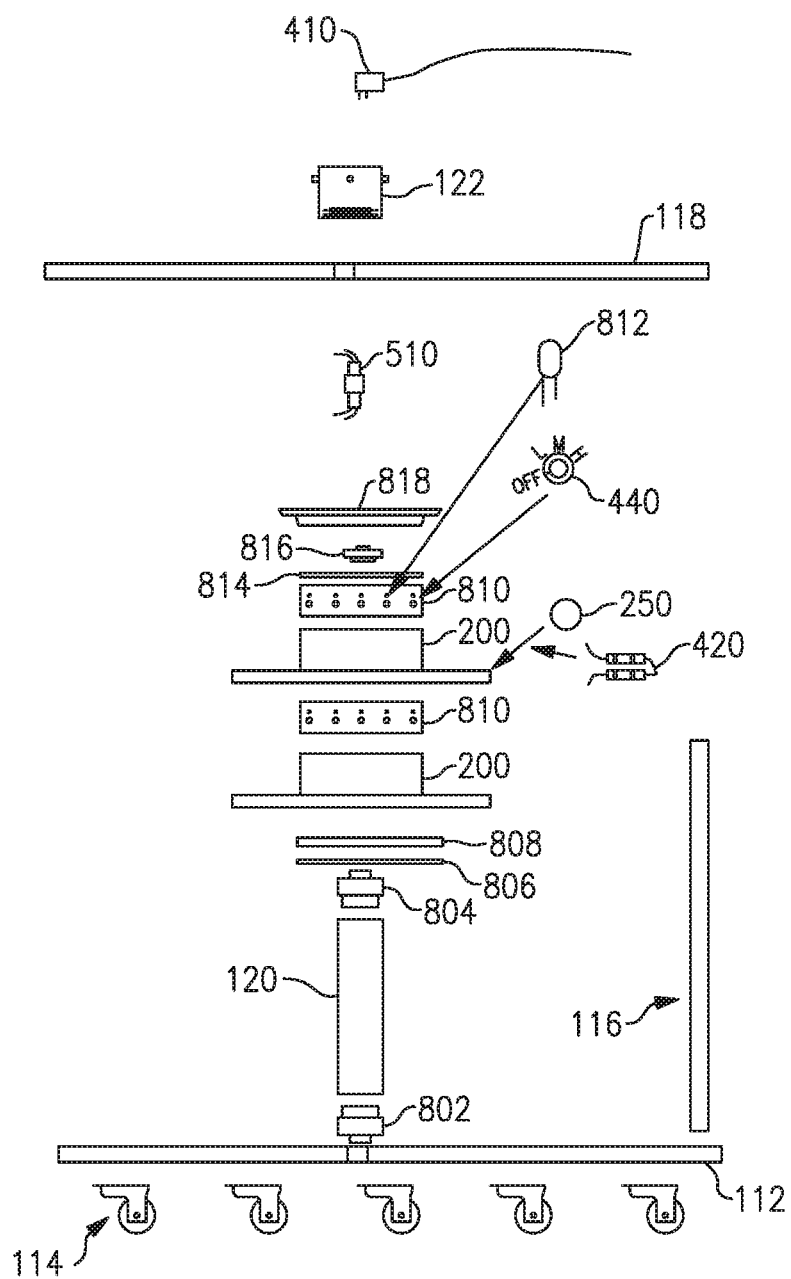
FIG. 8 is an exploded view of components of the system shown in FIG. 7.

FIGS. 8-9 show an exploded view of an exemplary assembly of parts and a list of an exemplary set of parts with example schematic symbols, respectively. The exploded view (FIG. 8) and parts list (FIG. 9) show the casters 114, the bottom plate 112, a frame upright 116, and a top plate 118. Supported by the bottom plate 112 are a bottom bearing 802, the center support column 120, and a lower air seal system made up of a mount air seal support plate 804, an air seal plate 806, and an air seal support plate 808. The lower air seal system supports two platters 200, stacked, with platter spacers 810 above each. In this example, the upper platter 200 includes multiple heating elements 420 (one for each segment that accommodates an animal cage), each disposed with a thermal disc 250, to form a flush surface on the platter 200. Also in this example, the upper spacer 810 is disposed with a heater switch 440 and an indicator light 812 for each of the heating elements 420. The upper spacer 810 is capped with a top platter spacer bearing support 814, a top bearing 816, and a top platter air seal gasket 818. A slip-ring 510 provides an electrical connection through the top plate 118, to which a power supply 410 is connected. Additionally, a top plate exhaust port 122 provides airflow access to a central region of the platters 200.

In various examples, control and monitoring of the temperature may occur in various ways. For example, the heating circuitry may be outfitted with network connectivity, which may include wireless capabilities such as wi-fi or Bluetooth, to allow remote control and monitoring of temperature or other environmental factors. Temperature data may be gathered over time and stored locally, or stored by an attached computing device, or shared over a network.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An animal caging system, comprising:
   a support structure configured to support a plurality of animal cages, the support structure including a plurality of segments, each segment configured to support a single animal cage, each of the plurality of animal cages including a gas inlet on an external wall of the animal cage, each segment and animal cage having complimentary shapes that cause the external walls of the animal cages to face outward from the support structure when the animal cages are mounted on the support structure;
   a plurality of thermal elements, each of the plurality of thermal elements configured to provide localized temperature adjustment to a selected one of the plurality of animal cages independent of any temperature adjustments provided to others of the plurality of animal cages, each of the segments having a thermal element disposed on a single lateral side of a center line thereof beneath a portion of a respective animal cage when the respective animal cage is mounted on the support structure, the portion of the respective animal cage configured to house an animal;
   a gas supply line coupled to a plenum within a support column of the animal caging system, the support column centrally located within the support structure of the animal caging system;
   a plurality of gas supply outlets formed on the support column and coupled to the plenum, the plurality of gas supply outlets being spaced from one another axially about the support column; and
   a plurality of gas supply hoses that couple to the gas supply outlets and respective ones of the gas inlets of the animal cages to provide gas to one or more of the plurality of animal cages independent of gas provided to others of the plurality of animal cages.

2. The system of claim 1 wherein each of the plurality of thermal elements is configured to receive a fluid or electricity.

3. The animal caging system of claim 2 wherein each of the plurality of thermal elements includes a thermal disc mounted to a floor of one of the plurality of animal cages.

4. The system of claim 1 wherein each of the plurality of thermal elements is configured to adjust temperature in only a portion of the selected animal cage.

5. The system of claim 1 further comprising a controller configured to control a temperature of the selected animal cage.

6. The system of claim 1 wherein the support structure is configured to allow at least one of the plurality of animal cages to be removable from the support structure.

7. The system of claim 1 wherein the support structure is a rotatable platter.

8. The system of claim 1 wherein the gas supply line is included in a system for provision of gases including one or more of anesthetic gases, medicinal gases, oxygen, or respiratory gases to individual ones of the plurality of animal cages independent of gas provided to others of the plurality of animal cages, each respective one of the gas outlets configured to disable flow of gas through the gas outlet when a supply hose is not connected to the gas outlet and enable flow of gas through the gas outlet when the supply hose is connected to the gas outlet.

9. An animal caging system comprising:
   one or more animal cages;
   one or more platters configured to support the one or more animal cages, each of the one or more platters including a plurality of segments, each of the plurality of segments configured to support a single animal cage;
   at least one thermal element configured to provide heat to at least one of the one or more animal cages independent of heat provided to other animal cages, each of segments having a thermal element disposed on a single lateral side thereof beneath a portion of a respective animal cage when the respective animal cage is mounted on the one or more platters, the portion of the respective animal cage configured to house an animal;
   a gas supply line coupled to a plenum within a support column of the animal caging system, the support column centrally located within the one or more platters, each of the animal cages including a gas inlet on an external wall of the animal cage, each segment and animal cage having complimentary shapes that cause the external walls of the animal cages to face fact outward from the support column when the animal cage is mounted on the animal caging system;
   a plurality of gas supply outlets formed on the support column and coupled to the plenum, the plurality of gas supply outlets being spaced from one another axially about the support column; and
   a plurality of gas supply hoses that couple to the gas supply outlets and respective ones of the gas inlets of the animal cages to provide gas to one or more of the one or more animal cages independent of gas provided to others of the one or more animal cages.

10. The animal caging system of claim 9 wherein the thermal element is an electrical component, the electrical component capable of converting electrical energy to thermal energy.

11. The animal caging system of claim 10, wherein the thermal element includes a thermal disc mounted to a floor of the one or more animal cages.

12. The animal caging system of claim 9 wherein the thermal element is a fluid conduit including a heat transfer surface.

13. The animal caging system of claim 9 further comprising a controller configured to control the thermal element.

14. The animal caging system of claim 13 wherein the controller is configured to variably control the temperature of the thermal element.

15. The animal caging system of claim 9 wherein the thermal element is disposed so that it provides heat to only a portion of the at least one of the one or more animal cages.

16. The animal caging system of claim 9 further comprising a rack frame configured to support the one or more platters and including at least one outlet to selectively provide a gas to at least one of the one or more animal cages.

17. The animal caging system of claim 9 wherein the gas supply line is included in a system for provision of gases including one or more of anesthetic gases, medicinal gases, oxygen, or respiratory gases to one of the one or more animal cages independent of gas provided to others of the one or more animal cages, each respective one of the gas outlets configured to disable flow of gas through the gas outlet when a supply hose is not connected to the gas outlet and enable flow of gas through the gas outlet when the supply hose is connected to the gas outlet.

18. A method of providing heating or cooling to an animal cage, the method comprising:
    supporting a plurality of animal cages by a support structure including a plurality of segments, each segment configured to support a single animal cage, each of the plurality of animal cages including a gas inlet on an external wall of the animal cage, each segment and animal cage having complimentary shapes that cause the external walls of the animal cages to face outward from the support structure when the animal cage is mounted on the support structure;
    providing thermal variation to each of the plurality of animal cages independent of other animal cages supported by the support structure with respective thermal elements, each of segments having a thermal element disposed on a single lateral side thereof beneath a portion of a respective animal cage when the respective animal cage is mounted on the support structure, the portion of the respective animal cage configured to house an animal; and
    providing gas to one of the plurality of animal cages independent of gas provided to others of the plurality of animal cages via a gas supply line coupled to a plenum within a support column centrally located within the support structure for the plurality of animal cages, a plurality of gas supply outlets formed on the support column and coupled to the plenum, the plurality of gas supply outlets being spaced from one another axially about the support column, and a plurality of gas supply hoses that couple to the gas supply outlets and respective ones of the gas inlets of the plurality of animal cages to provide gas to one or more of the plurality of animal cages independent of gas provided to others of the plurality of animal cages.

19. The method of claim 18 wherein providing thermal variation includes providing electricity or fluid.

20. The method of claim 18 further comprising controlling a quantity of thermal energy provided to or from each of the plurality of animal cages to regulate a temperature of each of the plurality of animal cages.

21. The method of claim 18 wherein providing thermal variation to each of the plurality of animal cages includes providing thermal variation to only a portion of each of the plurality of animal cages.

22. The method of claim 18 wherein providing the gas to the one of the plurality of animal cages includes providing the gas utilizing a system for provision of gases including one or more of anesthetic gases, medicinal gases, oxygen, or respiratory gases to individual ones of the plurality of animal cages independent of gas provided to others of the plurality of animal cages, each respective one of the gas outlets configured to disable flow of gas through the gas outlet when a supply hose is not connected to the gas outlet and enable flow of gas through the gas outlet when the supply hose is connected to the gas outlet.

23. An animal caging system, comprising:
    a support structure configured to support a plurality of animal cages, the support structure including one or more platters configured to support the one or more animal cages, each of the one or more platters including a plurality of segments, each of the plurality of segments configured to support a single animal cage each of the plurality of animal cages including a gas inlet on an external wall of the animal cage, each segment and animal cage having complimentary shapes that cause the external walls of the animal cages to face outward from the support structure when the animal cage is mounted on the support structure;
    a plurality of thermal elements including electrically controllable thermal discs mounted to the plurality of segments, each of the plurality of thermal elements configured to provide localized temperature adjustment to a selected one of the plurality of animal cages independent of any temperature adjustments provided to others of the plurality of animal cages, each of the segments having a thermal element disposed on a single lateral side thereof beneath a portion of a respective animal cage when the respective animal cage is mounted on the support structure, the portion of the respective animal cage configured to house an animal;
    a gas supply line coupled to a plenum within a support column of the animal caging system;
    a plurality of gas supply outlets formed on the support column and coupled to the plenum, the plurality of gas supply outlets being spaced from one another axially about the support column; and
    a plurality of gas supply hoses that couple to the gas supply outlets and respective gas inlets of the animal cages.

24. The system of claim 16 wherein each of the plurality of thermal elements is configured to adjust temperature in only a portion of the selected one of the plurality of animal cages.

* * * * *

UNITED STATES PATENT AND TRADEMARK OFFICE
CERTIFICATE OF CORRECTION

PATENT NO. : 10,820,566 B2
APPLICATION NO. : 15/409836
DATED : November 3, 2020
INVENTOR(S) : David Russell Heldt It is certified that error appears in the above-identified patent and that said Letters Patent is hereby corrected as shown below:

In the Claims

Column 12, Line 52, Claim number 9, delete "fact".

Signed and Sealed this
Twenty-second Day of December, 2020

Andrei Iancu
*Director of the United States Patent and Trademark Office*